US008475957B2

(12) United States Patent
Ramasubramanian et al.

(10) Patent No.: US 8,475,957 B2
(45) Date of Patent: *Jul. 2, 2013

(54) NEGATIVE ELECTRODE STRUCTURE FOR NON-AQUEOUS LITHIUM SECONDARY BATTERY

(75) Inventors: Murali Ramasubramanian, Fremont, CA (US); Robert M. Spotnitz, Pleasanton, CA (US); Nirav S. Shah, Pleasanton, CA (US); Ashok Lahiri, Cupertino, CA (US)

(73) Assignee: Enovix Corporation, Fremont, CA (US)

( * ) Notice: Subject to any disclaimer, the term of this patent is extended or adjusted under 35 U.S.C. 154(b) by 890 days.

This patent is subject to a terminal disclaimer.

(21) Appl. No.: 12/426,118

(22) Filed: Apr. 17, 2009

(65) Prior Publication Data
US 2012/0115026 A1    May 10, 2012

Related U.S. Application Data

(60) Provisional application No. 61/045,868, filed on Apr. 17, 2008.

(51) Int. Cl.
*H01M 4/00* (2006.01)
*H01M 4/02* (2006.01)
*H01M 4/58* (2010.01)

(52) U.S. Cl.
USPC ........ 429/218.1; 429/209; 429/219; 429/220; 429/221; 429/223; 429/231.5; 429/231.6; 429/231.8; 429/233; 429/245

(58) Field of Classification Search
USPC ........... 429/209, 218.1, 219, 221, 223, 231.5, 429/231.6, 231.8, 233, 245
See application file for complete search history.

(56) References Cited

U.S. PATENT DOCUMENTS

| 6,090,505 A | 7/2000 | Shimamura et al. |
| 6,235,427 B1 | 5/2001 | Idota et al. |
| 6,287,371 B1 | 9/2001 | Ota et al. |
| 6,525,391 B1 | 2/2003 | Bertrand et al. |

(Continued)

FOREIGN PATENT DOCUMENTS

| EP | 0883199 A1 | 12/1998 |
| EP | 1028476 A1 | 8/2000 |

(Continued)

OTHER PUBLICATIONS

Golodnitsky et al., "Advanced materials for the 3D microbattery," 2006, Journal of Power Sources, 153, pp. 281-287.*

(Continued)

*Primary Examiner* — Melvin C Mayes
*Assistant Examiner* — Colin W Slifka
(74) *Attorney, Agent, or Firm* — Bryan Cave LLP

(57) ABSTRACT

The present invention relates to a negative electrode structure for use in a non-aqueous electrolyte secondary battery and a method of making such negative electrode structure. The negative electrode structure comprises: a monolithic anode comprising a semiconductor material, and a uniform ion transport structure disposed at the monolithic anode surface for contacting a non-aqueous electrolyte, wherein the uniform ion transport structure serves as a current collector and the negative electrode structure does not contain another current collector. The present invention also relates to a battery comprising the negative electrode structure of the present invention, a cathode, and a non-aqueous electrolyte.

17 Claims, 5 Drawing Sheets

U.S. PATENT DOCUMENTS

| | | |
|---|---|---|
| 2004/0234861 A1 | 11/2004 | Kawase et al. |
| 2004/0241540 A1 | 12/2004 | Tsutsumi et al. |
| 2005/0095503 A1 | 5/2005 | Adachi et al. |
| 2005/0130383 A1 | 6/2005 | Divakaruni et al. |
| 2005/0208379 A1 | 9/2005 | Musha et al. |
| 2006/0093871 A1 | 5/2006 | Howard |
| 2008/0003490 A1 | 1/2008 | Christensen |
| 2009/0263716 A1 | 10/2009 | Ramasubramanian et al. |

FOREIGN PATENT DOCUMENTS

| | | |
|---|---|---|
| EP | 1100134 A1 | 5/2001 |
| EP | 1102340 A2 | 5/2001 |
| JP | 2003323882 A | 11/2003 |
| WO | 2008089110 A1 | 7/2008 |
| WO | WO 2008/089110 A1 | 7/2008 |
| WO | 2009129490 A1 | 10/2009 |
| WO | WO 2009/129490 A1 | 10/2009 |
| WO | 2009140300 A1 | 11/2009 |
| WO | WO 2009/140300 A1 | 11/2009 |

OTHER PUBLICATIONS

Broussely, Michel et al., Li-ion batteries and portable power source prospects for the next 5-10 years, Journal of Power Sources, 2004, 386-394, 136.

Harraz, F.A. et al., Immersion plating of nickel onto a porous silicon layer from fluoride solutions, Phys. Stat. Sol., 2003, 51-56, 197(1).

Harraz, Farid A. et al., Different Behavior in Immersion Plating of Nickel on Porous Silicon from Acidic and Alkaline Fluoride Media, Journal of the Electrochemical Society, 2003, C277-C284, 150(5).

Long, Jeffrey W. et al., Three-Dimensional Battery Architectures, Chemical Reviews, Aug. 14, 2004, 4463-4492, 104(10).

Obrovac, M. N. et al., Reversible Cycling of Crystalline Silicon Powder, Journal of the Electrochemical Society, 2007, A103-A108, 154(2).

Waidmann, S. et al., Tuning nickel silicide properties using a lamp based RTA, a heat conduction based RTA or a furnace anneal, Microelectronic Engineering, 2006, 2282-2286, 83.

Xu, Chengkun et al., Theorectical studies of displacement disposition of nickel into porous silicon with ultrahigh aspect ratio, Electrochimica Acta, Dec. 4, 2006, 3901-3909, 52.

Xu, Chengkun et al., Nickel Displacement Deposition of Porous Silicon with Ultrahigh Aspect Ratio, Journal of the Electrochemical Society, 2007, 170-174, 154(3).

Zhang, Xi et al., High Aspect Ratio Nickel Structures Fabricated by Electrochemical Replication of Hydrofluoric Acid Etched Silicon, Electrochemical and Solid-State Letters, 2006, C150-C152, 9(9).

Broussely, Michel et al., "Li-ion batteries and portable power source prospects for the next 5-10 years", Journal of Power Sources, 136, pp. 386-394 (2004).

Harraz, F.A. et al., "Immersion plating of nickel onto a porous silicon layer from fluoride solutions", Phys. Stat. Sol. (A), vol. 197, No. 1, pp. 51-56 (2003).

Harraz, Farid A. et al., "Different Behavior in Immersion Plating of Nickel on Porous Silicon from Acidic and Alkaline Fluoride Media", Journal of the Electrochemical Society, vol. 150, No. 5, pp. C277-C284 (2003).

Long, Jeffrey W. et al., "Three-Dimensional Battery Architectures", Chemical Reviews (Aug. 14, 2004), vol. 104, No. 10, pp. 4463-4492.

Obrovac, M. N. et al., "Reversible Cycling of Crystalline Silicon Powder", Journal of the Electrochemical Society, vol. 154, No. 2, pp. A103-A108 (2007).

Waidmann, S. et al., "Tuning nickel silicide properties using a lamp based RTA, a heat conduction based RTA or a furnace anneal", Microelectronic Engineering 83, pp. 2282-2286 (2006).

Xu, Chengkun et al., "Nickel Displacement Deposition of Porous Silicon with Ultrahigh Aspect Ratio", Journal of the Electrochemical Society, vol. 154, No. 3, pp. D170-D174 (2007).

Zhang, Xi et al., "High Aspect Ratio Nickel Structures Fabricated by Electrochemical Replication of Hydrofluoric Acid Etched Silicon", Electrochemical and Solid-State Letters, vol. 9, No. 9, pp. C150-C152 (2006).

\* cited by examiner

NEGATIVE ELECTRODE STRUCTURE FOR NON-AQUEOUS LITHIUM SECONDARY BATTERY

This application claims priority to U.S. Provisional Application No. 61/045,868, filed Apr. 17, 2008; the content of which is incorporated herein by reference in its entirety.

FIELD OF THE INVENTION

The present invention relates to negative electrode structures for use in non-aqueous electrolyte secondary batteries as well as methods for producing these negative electrode structures.

BACKGROUND OF THE INVENTION

Non-aqueous electrolyte secondary batteries are a type of rechargeable battery in which ions move between the anode and cathode through a non-aqueous electrolyte. Non-aqueous electrolyte secondary batteries include lithium-ion, sodium-ion, and potassium-ion batters as well as other battery types.

Lithium-ion batteries are a popular type of non-aqueous electrolyte secondary battery in which lithium ions move between the cathode and the anode thought the electrolyte. The benefits and the challenges of lithium-ion batteries are exemplary of the benefits and challenges of other non-aqueous electrolyte secondary batteries and the lithium-ion example is not limiting. In lithium-ion batteries, the lithium ions move from the anode to the cathode during discharge and from the cathode to the anode when charging. Lithium-ion batteries are highly desirable energy sources due to their high energy density, high power, and long shelf life. Lithium-ion batteries are commonly used in consumer electronics and are currently one of the most popular types of battery for portable electronics because they have high energy-to-weight ratios, no memory effect, and a slow loss of charge when not in use. Lithium-ion batteries are growing in popularity for in a wide range of applications including automotive, military, and aerospace applications because of these advantages.

FIG. 1 is a cross section of a prior art lithium-ion battery. The battery 15 has a cathode current collector 10 on top of which a cathode 11 is assembled. The cathode current collector 10 is covered by a separator 12 over which an assembly of the anode current collector 13 and the anode 14 is placed. The separator 12 is filled with an electrolyte that can transport ions between the anode and the cathode. The current collectors 10, 13 are used to collect the electrical energy generated by the battery 15 and connect it to an outside device so that the outside device can be electrically powered and to carry electrical energy to the battery during recharging.

Anodes of non-aqueous electrolyte secondary batteries can be made from composite or monolithic anode materials. In composite anodes, particulate anode material is physically bound together with a binder forming a matrix of the particles and the binder. For example, anodes can be made from carbonaceous particles bound with a polymer binder. Monolithic anodes are anodes that are not made by the addition of a physical binder material. Any method of creating of a silicon anode where the silicon molecules are interconnected without the aid of an external binding agent is a monolithic film. Examples of monolithic anode materials include monocrystalline silicon, polycrystalline silicon and amorphous silicon. Monolithic anodes can also be formed by melting or sintering particles of anode material or by vacuum and chemical deposition.

During the charging process of the lithium-ion battery, the lithium leaves the cathode and travels through the separator as a lithium ion and into the anode. During the discharge process, the lithium ion leaves the anode material, travels through the separator and passes through to the cathode. Elements like aluminum, silicon, germanium and tin react with lithium ions and are used in high-capacity anodes. Anode materials that react with lithium have active areas in which lithium can react and inactive areas in which lithium cannot react. The ratio of the active to inactive area of the anode affects the efficiency of the battery.

In the reaction of lithium ions in a lithium-reactive material, there is a significant volume difference between the reacted and extracted states; the reacted state of lithium-reactive anode materials occupies significantly more volume than the extracted state. Therefore, the anode changes volume by a significant fraction during every charge-discharge cycle. In lithium-reactive anodes, cracks in the anode material are often formed during the cycling volume change. With repeated cycling, these cracks can propagate and cause parts of the anode material to separate from the matrix. The separation of portions of the anode from cycling is known as exfoliation. Exfoliation causes a decrease in the amount of active anode material that is electrically connected to the current collector of the battery, thereby causing capacity loss.

Exfoliation and degradation due to cycling are especially problematic for monolithic and particulate anodes comprising semiconductor anode materials on current collectors. Monolithic films and composite layers of semiconductor anode materials on current collectors degrade during cycling because of the significant expansion of the monolithic anode material at the interface of the anode material and current collector. A typical anode film is pinned to the current collector due to the deposition characteristics. Current flows through the collector and causes the layer of the anode material adjacent to the film to react first. After ions react with the anode, the conductivity of the reacted areas increases. This causes the anode material film to expand more rapidly in this region and causes stress to build up. The stress can result in rupture of the anode material film from the current collector. Further, monolithic films and composite films of semiconductor anode material on current collectors degrade during cycling because of stress caused by the mismatch between the current gradient and the ion concentration gradient in the system. For example, in a lithium-ion battery with a monolithic silicon anode, the lithium concentration on the silicon is the highest near the silicon-electrolyte interface. However, the silicon reactivity is the least at the silicon-electrolyte interface due to the inherent poor conductivity of the silicon material itself. This causes non-uniform lithiation of the silicon and results in film disintegration due to non-uniform mechanical stress distribution. The same problem occurs in composite anode films of semiconductor anode materials.

FIG. 1 shows the schematic of an anode 14 on a current collector 13. The anode 14 is contacted with an electrolyte containing lithium ions as part of a battery 15. If a semiconductor-containing anode is used in such a conventional electrode configuration, the anode atoms furthest away from the current collector 13 have the highest lithium concentration when the anode structure is charged with lithium. However, the anode atoms closest to the current collector 13 are the ones that are the most electrically reactive due to the anode's 14 high resistivity. This competition between the electrical activity (applied potential) and chemical activity (lithium concentration) forces uneven lithiation in the anode 14. The uneven lithiation causes stress, primarily at areas of defects, grain boundaries, and areas where the current collector 13, anode 14, and the electrolyte-containing separator 12 meet (at the ends of the film not shown in FIG. 1). This results in uneven expansion resulting in anode exfoliation and cracking from the current collector 13.

SUMMARY OF THE INVENTION

The present invention is directed to a negative electrode structure for use in a non-aqueous electrolyte secondary battery. The negative electrode structure comprises: a monolithic anode comprising a semiconductor material, having a surface for contacting a non-aqueous electrolyte in a secondary battery; and a uniform ion transport structure disposed at the monolithic anode surface for contacting the non-aqueous electrolyte, wherein said uniform ion transport structure serves as a current collector and the negative electrode structure does not contain another current collector. The uniform ion transport structure comprises a deposited porous material, an ion-transporting material, an ion-reactive material, a composite material, or a physically porous material.

The present invention is also directed to a battery comprising the negative electrode structure of the present invention, a cathode, and a non-aqueous electrolyte.

The present invention is further directed to a method for forming a negative electrode structure for use in a non-aqueous electrolyte secondary battery. The method comprises the steps of: preparing a monolithic anode comprising a semiconductor material, the monolithic anode having a surface for contacting a non-aqueous electrolyte in a secondary battery; and integrally forming a uniform ion transport structure and current collector on the monolithic anode surface for contacting the non-aqueous electrolyte and collecting the current.

DETAILED DESCRIPTION OF THE INVENTION

The inventors of the present invention have discovered that using a uniform ion transport structure disposed on a surface of an anode can reduce degradation of the anode due to cycling and exfoliation. The uniform ion transport structure facilitates uniform ion transport by distributing current from the current collector across the surface of the anode. This causes more uniform insertion and extraction of the ions from the electrolyte and thereby reduces stress in the anode during cycling. Moreover, since the uniform ion transport structure distributes current to the interface of the anode and the electrolyte, the reactivity of the anode material will be highest at the electrolyte interface where the ion concentration is the highest. The uniform ion transport structure of the present invention must be porous so as to allow ions from the electrolyte to contact the anode. The uniform ion transport structure must also be highly conductive. Preferably, the uniform ion transport structure should have an electrical conductivity greater than 100 times that of the underlying semiconductor anode material.

The present invention includes a negative electrode structure for use in a non-aqueous electrolyte secondary battery. The negative electrode structure comprises a monolithic anode comprising a semiconductor material. The monolithic anode has a surface for contacting a non-aqueous electrolyte when the negative electrode structure is integrated into a secondary battery. The negative electrode structure also comprises a uniform ion transport structure disposed at the monolithic anode surface for contacting the non-aqueous electrolyte.

The inventors have discovered that a uniform ion transport structure can serve as a stand-alone current collector, and thus the negative electrode structure does not need to contain a separate current collector. In this embodiment, the uniform ion transport structure has two functions: one as a current collector, and the other one as an ionic interface for active materials in the anode. The inventors have discovered that when a uniform ion transport structure is coated on a monolithic anode, the resistance of the coating is low enough for the coating to be suitable as a current collector.

In an alternative embodiment, the negative electrode structure comprises a uniform ion transport structure and a current collector, wherein the current collector is in electrical contact with the uniform ion transport structure.

Figure 1:
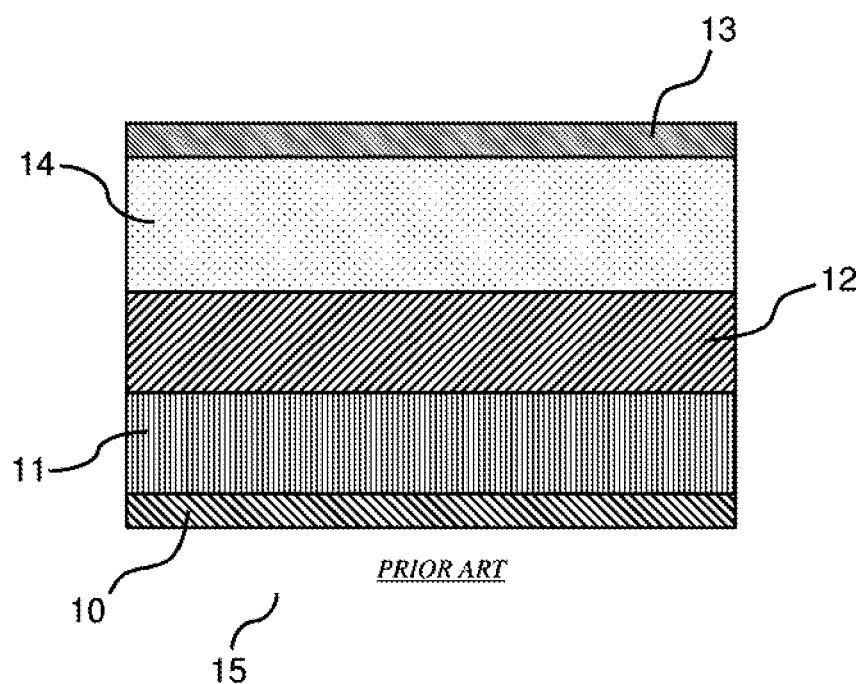
FIG. 1 depicts a cross section of a prior art lithium-ion battery.
Figure 2:
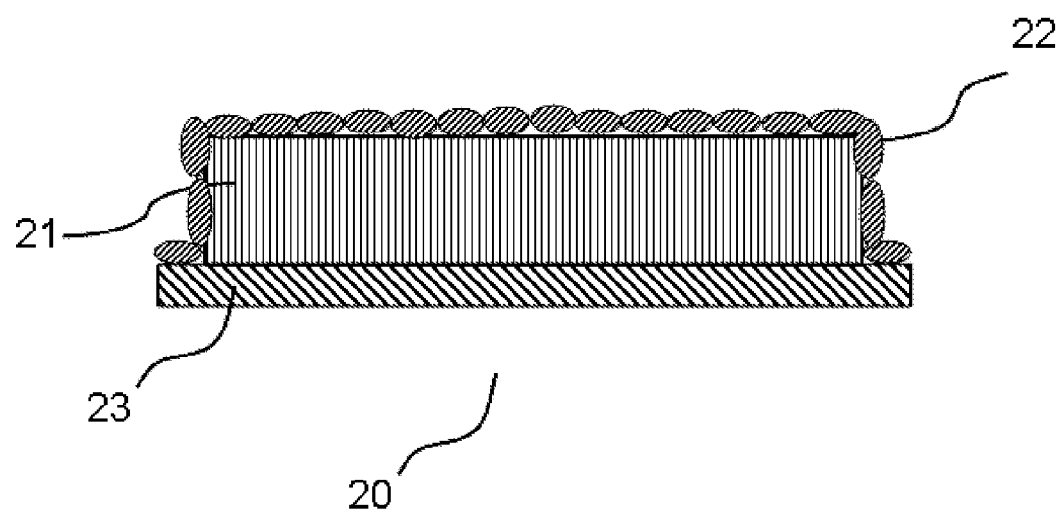
FIG. 2 depicts an exemplary negative electrode structure of the present invention.

FIG. 2 shows an exemplary negative electrode structure 20 of the present invention. An anode 21 comprising a semiconductor is deposited on a current collector 23. A uniform ion transport structure 22 is disposed on the surface of the anode 21 that is in contact with an electrolyte when the negative electrode structure 20 in incorporated into a battery. The uniform ion transport structure 22 is in electrical contact with the current collector 23.

The semiconductor anode material can be a semiconductor like silicon or germanium or a semiconductor alloy. The semiconductor anode material can also be a compound semiconductor like a III-V compound such as aluminum antimonide (AlSb), indium antimonide (InSb), gallium arsenide (GaAs), and indium phosphide (InP); or a II-VI compound such as cadmium telluride (CdTe) and cadmium-selenide (CdSe).

Monolithic anodes are anodes that are not made by the addition of a physical binder material. Examples of monolithic anode materials include monocrystalline silicon, polycrystalline silicon and amorphous silicon. Monolithic anodes containing semiconductor anode material used in the present invention can be formed by methods known in the art. Monolithic anodes can also be formed by melting or sintering particles of anode material or by vacuum and chemical deposition.

The anodes of the present invention can be planar or three dimensional. A planar battery has a positive electrode structure and a negative electrode structure in a parallel-plate configuration. A three-dimensional energy storage device can be one in which any one (or more) of an anode, a cathode, and a separator are non-planar in nature, and an actual surface area for such non-planar component is greater than twice its geometrical surface area. In some instances, a separation between two height planes on a third dimension should be at least greater than a periodicity in an x-y plane divided by a square root of two. For example, for a 1 cm×1 cm sample, a geometrical surface area is 1 $cm^2$. However, if the sample is not flat but has a groove in a depth dimension whose depth is greater than one divided by the square root of two, or 0.707 cm, then its actual surface area would be greater than 2 $cm^2$.

The uniform ion transport structure of the present invention refers that the underlying anode electrode is completely coated, and the coating is substantially equivalent in thickness on all areas exposed to the electrolyte. "Substantially equivalent," as used herein, means that the thickness is equivalent within 20%, and preferably within 10%. The uniform ion transport structure of the present invention comprises a high-conductivity deposited porous material. A deposited porous film is one that is permeable to the ions in the electrolyte in view of the thickness of the film. Most deposition films have a nucleation and a growth phase. These deposition films must have a minimum thickness to overcome nucleation deficiencies which cause porosity. Typically, the minimum thickness for deposition films is about 300 Angstroms to overcome nucleation deficiencies and its resulting porosity. Most deposited films below 300 Angstroms will be so porous due to nucleation deficiencies that the ion conduction function of the layer is compromised. Thus, about 300 Angstroms is a practical lower limit. Some deposited films about 800 Angstroms have been observed to be sufficiently porous to function as a uniform ion transport structure of the present invention. In one embodiment, the deposit materials have a thickness of about 300-800 Angstroms. As used herein, the term about means±15% of the specified value. For example, a film of about 800 Angstroms of gold vacuum deposited onto an anode has a sufficiently porous nature for the anode to be in contact with the electrolyte while providing adequate electrical connectivity.

All metals that alloy with lithium or transport lithium can be used as uniform ion transport structures for this application. For example, nickel, copper, tin, gold, aluminum are suitable for this application. Some non-restrictive examples of materials that can be used for the deposited porous layer are metallic silicides such as nickel silicide, cobalt silicide, and gold silicide. Other porous conducting materials such as carbon black and graphite can also be used. Most metals can be deposited as thin porous films using vacuum deposition and other well known methods for metal deposition.

In addition, the uniform ion transport structure can be made of composite particulate materials that provide macroscopic conductivity with porosity sufficient for the anode to interact with the ions in the electrolyte. For example, a combination of carbon black and binder such as PVDF (polyvinylidene fluoride) can be pasted on to the anode in order to provide conductivity at the interface layer.

The uniform ion transport structure of the present invention can also comprise a high-conductivity ion-transporting material. An ion-transporting material is one through which the ions in the electrolyte can pass to reach the anode.

Alternatively, the uniform ion transport structure can comprise a high-conductivity ion-reactive material. High-conductivity ion-reactive materials are ones that can react with the ions in the electrolyte. Examples of high-conductivity ion-reactive materials include metal-semiconductor alloys like metal silicides and germanicides. Many metal silicides have been known to interact with ions used in batteries like lithium ions. Examples include the silicides of nickel, cobalt, iron, magnesium, calcium, molybdenum, gold, silver, and aluminum. Metal silicides also provide very good electrical conductivity when compared to silicon. A uniform silicide coating on top of a silicon structure provides significantly better electrical conductivity for the particle than the native silicon structure itself. For example, typical silicon powder has a resistivity of 1-100 $\Omega$/cm; whereas a nickel silicide layer of composition NiSi has a resistivity of 10-60 $\mu\Omega$/cm.

Typically metal-semiconductor alloys are formed through a multi-step process. First, the semiconductor surface is prepared by removing any oxide layer that is present; second, the metal layer is deposited on the semiconductor; and third, the metal semiconductor stack is annealed at a suitable temperature to form the metal-semiconductor alloy. The ion-reactive layers, such as metal-semiconductor alloy layers, perform a dual purpose in that they act as a uniform ion transport structure in addition to being an ion cycling agent themselves. Because of this, the gravimetric energy density of a battery with an ion-reactive uniform ion transport layer can be greater than if the uniform ion transport layer were not ion-reactive.

A metal-semiconductor alloy, such as metal silicide, can also be formed by a displacement process. To form a metal-semiconductor alloy on a semiconductor-containing anode material by a displacement process, a semiconductor-containing anode material is prepared and a displacement solution comprising metal ions and a dissolution component for dissolving semiconductor in the anode material is prepared. When the anode is contacted with the displacement solution, some of the semiconductor dissolves in the displacement solution. The dissolution of the semiconductor reduces metal ions in the displacement solution to metal. The metal deposits out of the solution onto the portion of the anode material. The portion of the anode material and the deposited nickel are then annealed to convert the deposited metal to the metal-semiconductor alloy. The displacement process has been described in U.S. application Ser. No. 12/105,090, which is incorporated herein by reference.

The uniform ion transport structure can comprise a composite material. A composite material for a uniform ion transport structure comprises a combination of two or more materials such as carbon black and binder. The uniform ion transport structure of the composite material provides the electrical conduction pathway at the anode-electrolyte interface and is also porous in order to allow the solution to access the silicon negative electrode material.

Figure 3:
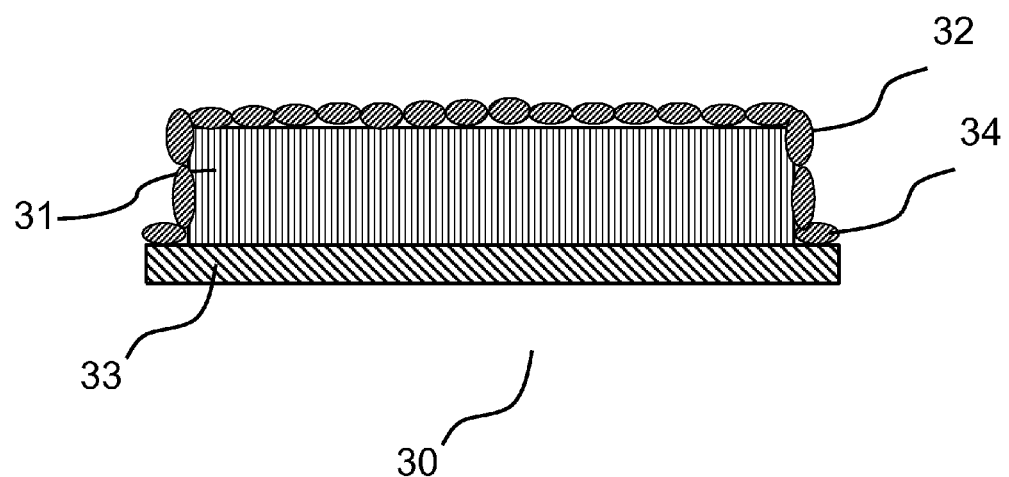
FIG. 3 depicts a preferred negative electrode structure of the present invention.

In a preferred embodiment, the uniform ion transport structure also serves as a current collector. In this embodiment, the current collector is integrally formed with the ion transport structure, and the ion transport structure and the current collector are formed in the same process. FIG. 3 shows an example where the current collector 34 is formed in the same process as the ion transport structure 32. Since the material of ion transport structure 32 is highly-conductive, it can be used to form the current collector 34 that performs the task of collecting the current to the outside tabs of the battery. In FIG. 3, the underlying substrate 33 can be insulating or conductive.

The negative electrode structures of the present invention may be incorporated in non-aqueous electrolyte secondary batteries. The present invention also includes a non-aqueous electrolyte secondary battery comprising the negative electrode structure of the present invention, a cathode, and a non-aqueous electrolyte.

The negative electrode structures of the present invention can be formed by preparing a monolithic anode of a high-resistance material having a surface for contacting a non-aqueous electrolyte in a secondary battery; forming a uniform ion transport structure on the monolithic anode surface for contacting the non-aqueous electrolyte; and forming a current collector electrically connected to the uniform ion transport structure.

In a preferred embodiment, the negative electrode structures of the present invention is formed by preparing a monolithic anode comprising a semiconductor material, the monolithic anode having a surface for contacting a non-aqueous electrolyte in a secondary battery; and integrally forming a uniform ion transport structure and current collector on the monolithic anode surface for contacting the non-aqueous electrolyte and collecting the current.

In one embodiment, the negative electrode structures of the present invention are formed by preparing a composite anode of a semiconductor material and a binder having a surface for contacting a non-aqueous electrolyte in a secondary battery; integrally forming a uniform ion transport structure and current collector on the composite anode surface for contacting the non-aqueous electrolyte and collecting the current.

In one embodiment, the uniform ion transport structure may be formed by depositing porous material on the monolithic anode material. In another embodiment, the uniform transport structure can be a metal-semiconductor alloy, such as a silicide or a germanicide. In one embodiment, the metal-semiconductor alloy is formed by a displacement plating process.

Figure 4:
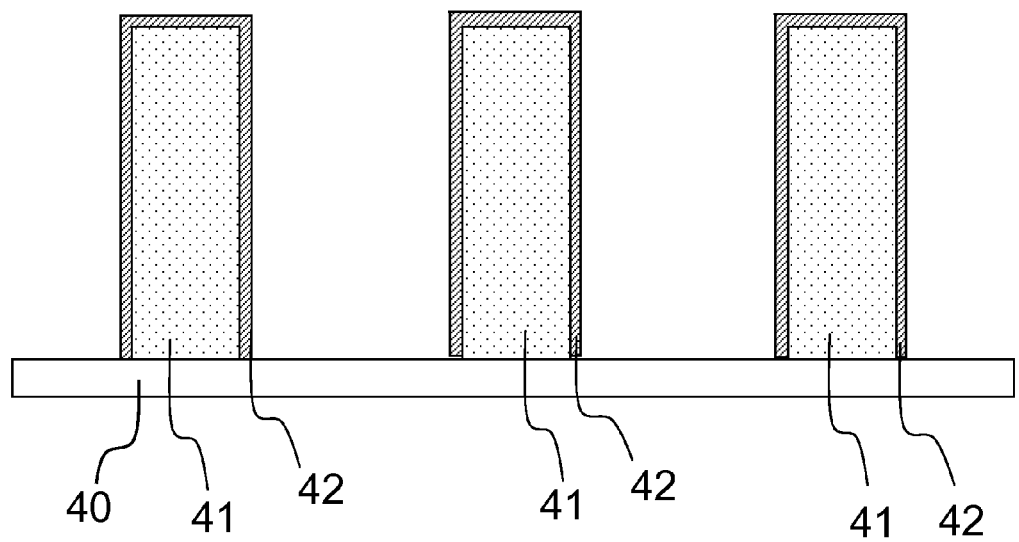
FIG. 4 depicts a three dimensional anode structure built on a base layer.

The negative electrode structures of the present invention can be three-dimensional structures. The methods of forming negative electrode structures of the present invention can be used on three-dimensional structures. FIG. 4 shows such an example of a three dimensional anode structure 41 built on a base layer 40. The base layer can be either a conductive material or a non-conductive material. The uniform ion transport structure 42 is disposed the surface of the anode structure 41 for contacting the electrolyte when integrated into a battery. In the case of a conductive base layer 40, the uniform ion transport structure 42 can connect to the base layer 40 to equalize current across various features. In the case of a non-conductive base layer 40, the uniform ion transport structure 42 needs to be interconnected across the individual anode structures 41 to provide electrical continuity.

Figure 5:
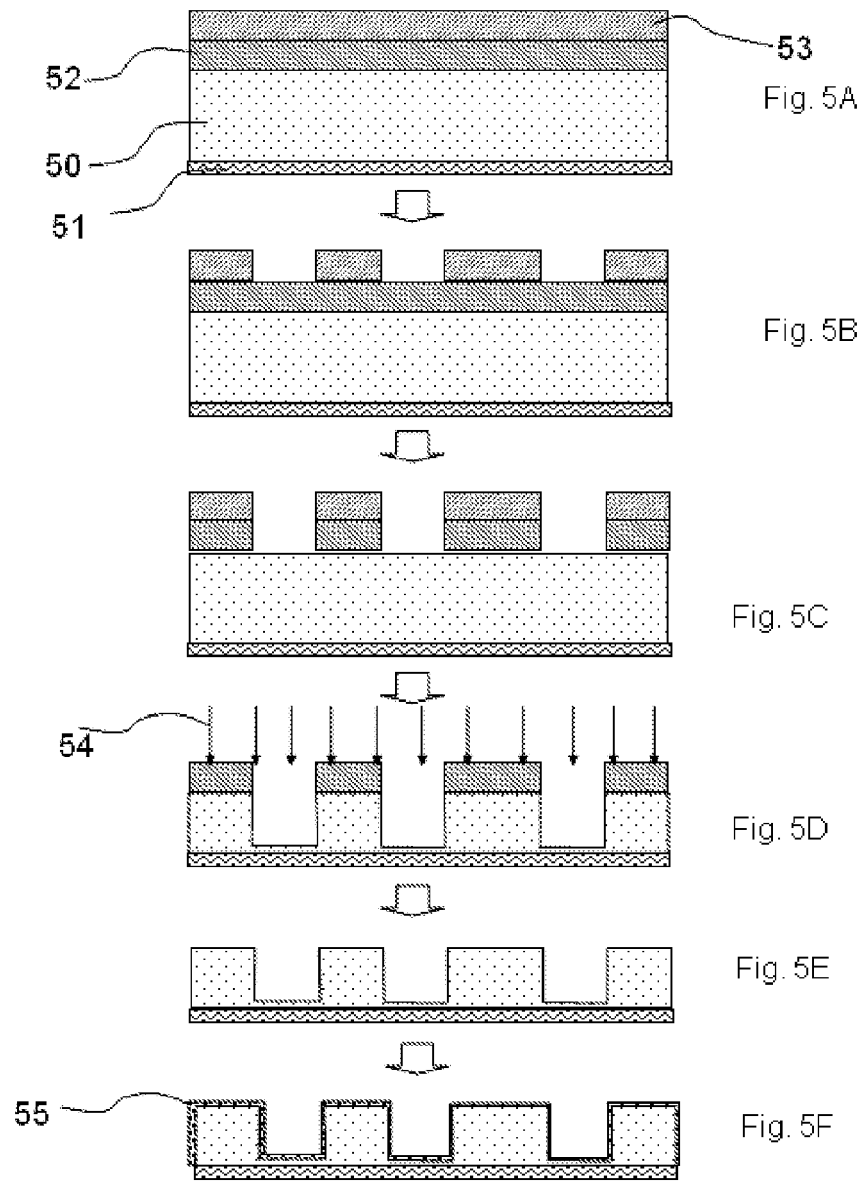
FIGS. 5A-5F illustrate a method to form a three dimensional anode structure with pillars.

FIGS. 5A to 5F illustrate a method to form a three dimensional anode structure with pillars. A monocrystalline, polycrystalline, or amorphous substrate 50 can be used. A current collecting layer 51 is then deposited on one side of the substrate. Once this is done, a masking layer 52 is deposited on the other side of the substrate 50 by methods such as vacuum deposition, thermal oxidation, surface coating, and wet chemical deposition. In the case of silicon as the substrate 50, a thermally grown silicon dioxide layer of a particular thickness may serve as the masking layer 52. This layer 52 may be subsequently patterned by standard patterning techniques such as lithography in order to provide a pattern suitable for further processing to create the desired pillar structure. In some embodiments of the invention, the masking layer 52 may be covered with a second masking layer 53 that is used to pattern the first masking layer 52 (see FIGS. 5A-5B). In this case, the first masking layer 52 is patterned by using the second masking layer 53 as a stencil (see FIG. 5C). For the silicon/silicon dioxide case, a standard photoresist may be used as the second masking layer 53. The second masking layer 53 may be patterned with standard lithography techniques. The first masking layer 52 can then be patterned using selective wet or dry methods such as wet etch or reactive ion etch. Subsequently, the second masking layer can be stripped, leaving behind the patterned first masking layer 52 (see FIG. 5D). This combination of the substrate 50 and the patterned first masking layer 52 is subjected to a directional plasma 54 in a controlled environment in order to transfer the image of the first masking layer 52 onto the substrate 50 (see FIG. 5D). This reactive etch process in the presence of a directional plasma source may provide excellent anisotropic etching of the substrate 50 while etching the masking layer 52 itself at a very low rate. The reactive etch may remove the substrate 50 down to the current collecting layer 51 or the reactive etch may leave a portion of the substrate 50 on the current collecting layer 51 as shown in FIG. 5D. After the reactive etch of the substrate 50 is substantially complete, the masking layer 52 may be removed to leave the patterned substrate 50 behind, thereby forming the desired pillar structure (see FIG. 5E). After this, the structure can be used to deposit the uniform ion transport structure 55 that is porous and that covers the silicon surface thereby ensuring uniform lithiation.

Although the invention has been described with reference to the presently preferred embodiments, it should be understood that various modifications could be made without departing from the scope of the invention.

What is claimed is:

1. A non-aqueous electrolyte secondary battery comprising a negative electrode structure, a cathode, a non-aqueous electrolyte, and an interface between the non-aqueous electrolyte and the negative electrode structure, the negative electrode structure comprising a monolithic anode having a surface and a uniform ion transport structure on and covering the monolithic anode surface at the interface between the negative electrode structure and the electrolyte, the monolithic anode comprising a semiconductor material, the uniform ion transport structure having a thickness of at least about 300 Angstroms, the thickness of the uniform ion transport structure being substantially equivalent in all areas of the surface of the monolithic anode at the interface between the negative electrode structure and the electrolyte, wherein said uniform ion transport structure serves as a current collector and the negative electrode structure does not contain another current collector.

2. The non-aqueous electrolyte secondary battery of claim 1, wherein the monolithic anode is in the form of a planar film.

3. The non-aqueous electrolyte secondary battery of claim 1, wherein the monolithic anode is in the form of a three-dimensional film.

4. The non-aqueous electrolyte secondary battery of claim 1, wherein the uniform ion transport structure comprises a deposited porous material.

5. The non-aqueous electrolyte secondary battery of claim 1, wherein the thickness of the uniform ion transport structure is about 300-800 Angstroms.

6. The non-aqueous electrolyte secondary battery of claim 1, wherein the uniform ion transport structure comprises a metal selected from the group consisting of nickel, copper, tin, gold, and aluminum.

7. The non-aqueous electrolyte secondary battery of claim 1, wherein the uniform ion transport structure comprises a metal silicide or metal germanicide.

8. The non-aqueous electrolyte secondary battery of claim 1, wherein the uniform ion transport structure comprises a metal silicide selected from the group consisting of nickel silicide, cobalt silicide, iron silicide, magnesium silicide, calcium silicide, molybdenum silicide, gold silicide, silver silicide, and aluminum silicide.

9. The non-aqueous electrolyte secondary battery of claim 1, wherein the uniform ion transport structure comprises a composite material.

10. The non-aqueous electrolyte secondary battery of claim 1, wherein the uniform ion transport structure comprises a physically porous material.

11. The non-aqueous electrolyte secondary battery of claim 10 wherein the physically porous material is carbon black or graphite.

12. The non-aqueous electrolyte secondary battery of claim 1 wherein the uniform ion transport structure has an electrical conductivity that is more than 100 times greater than the electrical conductivity of the semiconductor material.

13. The non-aqueous electrolyte secondary battery of claim 12 wherein the uniform ion transport structure has a thickness of about 300-800 Angstroms.

14. The non-aqueous electrolyte secondary battery of claim 12 wherein the uniform ion transport structure comprises nickel silicide.

15. The non-aqueous electrolyte secondary battery of claim 14 wherein the uniform ion transport structure has a thickness of about 300-800 Angstroms.

16. The non-aqueous electrolyte secondary battery of claim 1 wherein the uniform ion transport structure comprises a silicide of nickel, cobalt, iron, magnesium, calcium, molybdenum, gold, silver or aluminum.

17. The non-aqueous electrolyte secondary battery of claim 16 wherein the uniform ion transport structure has a thickness of about 300-800 Angstroms.

\* \* \* \* \*